(12) United States Patent
Ducatel et al.

(10) Patent No.: US 10,044,761 B2
(45) Date of Patent: *Aug. 7, 2018

(54) USER AUTHENTICATION BASED ON USER CHARACTERISTIC AUTHENTICATION RULES

(71) Applicant: British Telecommunications Public Limited Company, London (GB)

(72) Inventors: Gery Michel Ducatel, London (GB); Theo Dimitrakos, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/126,861

(22) PCT Filed: Mar. 17, 2015

(86) PCT No.: PCT/GB2015/050769
§ 371 (c)(1),
(2) Date: Sep. 16, 2016

(87) PCT Pub. No.: WO2015/140531
PCT Pub. Date: Sep. 24, 2015

(65) Prior Publication Data
US 2017/0093920 A1    Mar. 30, 2017

(30) Foreign Application Priority Data
Mar. 18, 2014   (EP) .................................. 14250046

(51) Int. Cl.
*H04L 29/06* (2006.01)
*G06N 99/00* (2010.01)

(52) U.S. Cl.
CPC ........... *H04L 63/20* (2013.01); *G06N 99/005* (2013.01); *H04L 63/083* (2013.01);
(Continued)

(58) Field of Classification Search
CPC ....... H04L 63/20; H04L 63/083; H04L 63/10; G06N 99/005; G06F 2221/2111
See application file for complete search history.

(56) References Cited

U.S. PATENT DOCUMENTS

2002/0087894 A1 * 7/2002 Foley .................... H04L 63/083
726/4
2003/0115142 A1   6/2003 Brickell et al.
(Continued)

FOREIGN PATENT DOCUMENTS

EP        1603003 A1      12/2005
WO    WO 2007/115209 A2   10/2007

OTHER PUBLICATIONS

U.S. Appl. No. 15/126,925, filed Sep. 16, 2016, Inventor(s): Ducatel et al.
Application and Filing Receipt for U.S. Appl. No. 15/120,566, filed Aug. 22, 2016, Inventor(s): Robert Rowlingson.
International Search Report for corresponding International Application No. PCT/GB2015/050769 dated Jun. 22, 2015; 4 pages.
(Continued)

*Primary Examiner* — Wasika Nipa
(74) *Attorney, Agent, or Firm* — Amy M. Samela; Patterson Thuente Pedersen, P.A.

(57) ABSTRACT

An authentication apparatus to authenticate a user requesting access to a restricted resource in a computer system comprising: an interface adapted to receive an indication of a user request to access the restricted resource, the request having associated a current user context defining one or more characteristics of the user; a receiver adapted to receive a user selected authentication scheme from a set of authentication schemes for the current user context; a comparator adapted to compare the user selected authentication scheme with a set of user-specific rules, each rule indicating one or more authentication schemes for a user context as preferred authentication schemes; an access controller adapted to permit access to the restricted resource based on the com-
(Continued)

parison so as to prevent access to the restricted resource when the rules indicate one or more authentication schemes other than the user selected authentication scheme are preferred for the current user context.

18 Claims, 6 Drawing Sheets

(52) U.S. Cl.
CPC .......... *H04L 63/0861* (2013.01); *H04L 63/10* (2013.01); *G06F 2221/2111* (2013.01); *H04L 2463/082* (2013.01)

(56) References Cited

U.S. PATENT DOCUMENTS

| | | |
|---|---|---|
| 2007/0079136 A1 | 4/2007 | Vishik et al. |
| 2008/0028453 A1 | 1/2008 | Nguyen et al. |
| 2011/0047608 A1 | 2/2011 | Levenberg |
| 2011/0314549 A1 | 12/2011 | Song et al. |
| 2012/0137340 A1* | 5/2012 | Jakobsson .............. G06F 21/316 726/1 |
| 2013/0047204 A1 | 2/2013 | Radhakrishnan |
| 2017/0011212 A1 | 1/2017 | Rowlingson |
| 2017/0099278 A1 | 4/2017 | Ducatel et al. |

OTHER PUBLICATIONS

Written Opinion of the International Searching Authority for corresponding International Application No. PCT/GB2015/050769 dated Jun. 22, 2015; 5 pages.
International Preliminary Report on Patentability for corresponding International Application No. PCT/GB2015/050769 dated Sep. 20, 2016; 6 pages.
Bolten, Joshua B.; Executive Office of the President Office of Management and Budget, Washington, D.C.; Dec. 16, 2003 M-04-04; Memorandum to the Heads of All Departments and Agencies; E-Authentication Guidance for Federal Agencies; 17 pages.
Burr et al.; NIST Special Publication 800-63-2; Electronic Authentication Guideline; Computer Security; U.S. Department of Commerce Aug. 2013; 123 pages.
Clare et al., "Knowledge Discovery in Multi-Label Phenotype Data" Principles of Data Mining and Knowledge Discovery (Aug. 28, 2001) vol. 2168; pp. 42-53.
Bouneffouf et al., Following the User's Interests in Mobile Context-Aware Recommender Systems: The hybrid-E-greedy algorithm; 2012 26$^{th}$ International Conference on Advanced Information Networking and Applications Workshops; Department of Computer Science, Telecom SudParis, UMR CNRS Samovar, 91011 Evry Cedex, France; pp. 657-662; 6 pages total (IEEE, 2012).

* cited by examiner

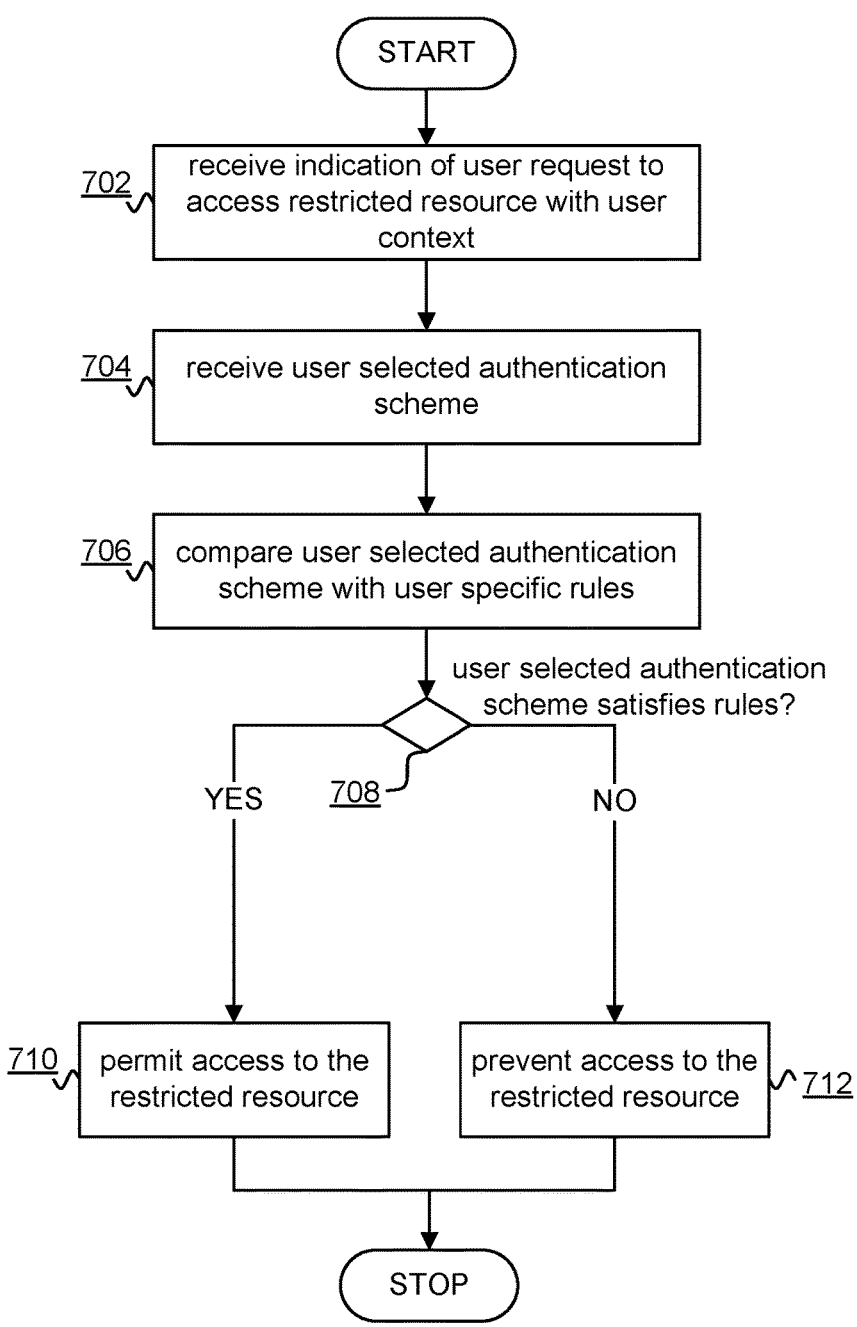

USER AUTHENTICATION BASED ON USER CHARACTERISTIC AUTHENTICATION RULES

CROSS-REFERENCE TO RELATED APPLICATIONS

The present application is a National Phase entry of PCT Application No. PCT/GB2015/050769, filed on 17 Mar. 2015, which claims priority to EP Patent Application No. 14250046.1, filed on 18 Mar. 2014, which are hereby fully incorporated herein by reference.

TECHNICAL FIELD

The present disclosure relates to user authentication. In particular, the present disclosure relates to authentication rules for user authentication.

BACKGROUND

Authentication of users requesting access to computing resources is possible using a variety of techniques, each technique having a relative degree of assurance (whether objectively or subjectively defined). To improve authentication assurance more challenging approaches to authentication are devised combining one or more of: things users know (like secrets, passphrases etc.); things users have (like hardware tokens, smartcards etc.); and things users are (such as biometric indicators). Such approaches are known as n-factor authentication schemes.

Context based authentication is known. US Patent Publication No. 2007/0079136A1 describes methods and systems for performing authentication based at least in part on the context of a transaction. Further, European Patent Publication No. EP1603003A1 describes a method of authorizing a user in communication with a workstation using different methods for authorization in dependence on combinations of user data and workstation data, such as a geographic location of the workstation.

Context based authentication schemes imply the availability of multiple authentication methods to check and/or validate a user identity such that different authentication methods can be employed alone or in combination in dependence on an authentication context. Such different authentication methods can have different levels of assurance of the authentication. One way to define levels of assurance for authentication methods or schemes can be to determine objective characteristics and features of such methods and schemes. For example, the Office of Management and Budget (OMB) of the United States Government published "E-Authentication Guidance of Federal Agencies" (Memorandum M04-04, Office of Management and Budget, Executive Office of the President, 2003). The guidance defines four levels of authentication assurance as:

Level 1: Little or no confidence in the asserted identity's validity.
Level 2: Some confidence in the asserted identity's validity.
Level 3: High confidence in the asserted identity's validity.
Level 4: Very high confidence in the asserted identity's validity.

The levels of authentication assurance are characterized by technical guidelines for each level for different authentication methods in the National Institute of Standards and Technology (NIST) document "Electronic Authentication Guideline" (NIST Special Publication 800-63-2, 2013). FIG. 1 depicts the NIST SP 800-63-1 E-Authentication Architectural Model in the prior art. A process of registration by a user 110, credential issuance and maintenance includes:

1. A user 110 applies to a registration authority 106 through a registration process.
2. The registration authority 106 identity proofs the user 110.
3. On successful identity proofing, the registration authority 106 sends a credential service provider 108 a registration confirmation message.
4. An authentication credential such as a secret token is established between the credential service provider 108 and the user 110.
5. The credential service provider 108 maintains the credential, its status, and the registration data collected for the lifetime of the credential (at a minimum). The user 110 maintains his or her token.

Subsequent to registration, a process of authentication of the user 110 includes:

1. The user 110 proves to the verifier 114 that he or she possesses and controls an authentication credential through an authentication protocol.
2. The verifier 114 interacts with the credential service provider 108 to validate the credential that binds the user's identity to his or her token.
3. The verifier 114 provides an assertion about the user 110 to the relying party 112 which uses the information in the assertion to make an access control or authorization decision.
4. An authenticated session is established between the user 110 and the relying party 112.

NIST defines characteristics of the above steps for each of the OMB levels of authentication assurance. Accordingly, system or service having multiple points of access, or access modes, each access mode requiring a different level of assurance, can be supported by multiple and potentially many different authentication methods. Where multiple authentication methods are available a decision as to an applicable authentication method for a user is made. US Patent Publication No. 2011/0047608 A1 describes an approach to dynamic user authentication in which one or more modes of authentication are dynamically selected based on various factors surrounding a request. Factors can include time of day, past action history of the user and the resource to which access is requested. The selection of authentication criteria are based on an authentication level that is determined based on a service accessed and factors associated with the access. However, despite the dynamic selection of modes of authentication, such as for different levels of authentication, authentication is still restricted to traditional authentication factors (i.e. something a user knows, has, or is). Further, where authentication schemes are attacked due to compromise of an authentication credential or mechanism, such as a stolen hardware token or misappropriated passphrase, authentication schemes are unable to detect the attack since the approach to authentication can be essentially acceptable. Thus it would be advantageous to provide for multi-level authentication of users requesting access to restricted resources of a service with improved assurance and improved protection against authentication attack.

SUMMARY

The present disclosure accordingly provides, in a first aspect, a method of user authentication for user access to a restricted resource in a computer system comprising: receiving an indication of a user request to access the restricted resource, the request having associated a current user context defining one or more characteristics of the user; receiving a user selected authentication scheme from a set of authentication schemes for the current user context; comparing the user selected authentication scheme with a set of user-specific rules, each rule indicating one or more authentication schemes for a user context as preferred authentication schemes; permitting access to the restricted resource based on the comparison so as to prevent access to the restricted resource when the rules indicate one or more authentication schemes other than the user selected authentication scheme are preferred for the current user context.

Thus in this way authentication for a requesting user is based partly on user-specific rules indicating preferred authentication schemes. Preferred authentication schemes can be learned through a learning process, such as a machine learning, historical learning, statistical or other process. Such preferred authentication schemes reflect the behavior and preferences of a user and represent typical, most likely, most probable, most effective or least unlikely authentication schemes. Recognizing deviations from typical, preferred, consistent or most effective schemes based on a user's past authentications serves as an additional behavioral or "soft-biometric" dimension of authentication, as an additional factor to any n-factor authentication scheme. In contrast to existing approaches, the user-specific rules serve to complement the authentication mechanism and, in particular, serve to identify authentication attempts which are atypical based on historical, behavioral, typical or statistical determinations. In some embodiments, the user-specific rules serve to identify inconsistent authentication attempts and flag such attempts for handling, such as precluding authentication. Identification of authentication attempts with inconsistent, atypical and/or less probable features results in preventing access to a restricted resource. In some embodiments, the prevention of access to the restricted resource can be accompanied by a transition to an authentication scheme providing an increased level of assurance. Thus, the requesting user can access the resource on satisfaction of authentication requirements corresponding to the increased level of assurance. Thus, embodiments of the present disclosure provide considerably enhanced authentication in which the soft-biometric of a user's interaction with, use of and/or consistency with an authentication scheme serves, in itself, to contribute to the process of authentication.

In an embodiment, the user context has associated a predetermined authentication level indicating a level of assurance of authentication required for the user context.

In an embodiment, the set of authentication schemes for the current user context is a subset of a set of all authentication schemes available for the computer system, the subset including authentication schemes being predetermined to provide a level of assurance of authentication in accordance with the authentication level for the user context.

In an embodiment, each rule in the set of user-specific rules is defined for a user context in a set of user contexts based on a learning process whereby preferred authentication schemes are identified based on a frequency of use of the authentication schemes in prior requests by the requesting user to access the restricted resource.

In an embodiment, the learning process for a user context includes, for a plurality of prior requests to access the restricted resource by any user: determining a frequency of use of each authentication scheme; and determining a rate of successful authentication of each authentication scheme.

In an embodiment, the learning process for a user context further includes, for a plurality of prior requests to access the restricted resource by the requesting user: determining a frequency of use of each authentication scheme; and determining a rate of successful authentication of each authentication scheme.

In an embodiment, the learning process for a user context further includes, for the requesting user, evaluating a probability that the user is authenticated by each authentication scheme.

In an embodiment, the probability for each authentication scheme is a product of the frequency of use by the requesting user and the rate of successful authentication of the requesting user for the authentication scheme.

In an embodiment, one or more preferred authentication schemes for the requesting user in a user context are identified based on authentication schemes having a greatest probability.

In an embodiment, the learning process for a user context further includes evaluating a probability that any user is authenticated by each authentication scheme, and preferably the probability that any user is authenticated by each authentication scheme is a product of the frequency of use by any user and the rate of successful authentication for any user for the authentication scheme.

In an embodiment, one or more preferred authentication schemes for the requesting user in a user context are identified based on authentication schemes having a probability for the requesting user that differs from a probability for any user by at least a predetermined threshold.

In an embodiment, the user context defines characteristics of the requesting user taken from the set of: geographic location characteristics; computer network location characteristics; user device characteristics; user device type; user device facilities; user device capabilities; user device software version; and a class of the user in an access control system.

In an embodiment, the set of authentication schemes includes at least two of: password based authentication; passphrase based authentication; hardware token based authentication; software token base authentication; at least one biometric based authentication; multi-factor authentication including a plurality of authentication methods; certificate based authentication; authentication by a cloud security provider; authentication by a cloud service credential; authentication by a social network credential; and a smartcard based authentication.

The present disclosure accordingly provides, in a second aspect, an authentication apparatus to authenticate a user requesting access to a restricted resource in a computer system comprising: an interface adapted to receive an indication of a user request to access the restricted resource, the request having associated a current user context defining one or more characteristics of the user; a receiver adapted to receive a user selected authentication scheme from a set of authentication schemes for the current user context; a comparator adapted to compare the user selected authentication scheme with a set of user-specific rules, each rule indicating one or more authentication schemes for a user context as preferred authentication schemes; an access controller adapted to permit access to the restricted resource based on the comparison so as to prevent access to the restricted resource when the rules indicate one or more authentication schemes other than the user selected authentication scheme are preferred for the current user context.

In an embodiment, the user context has associated a predetermined authentication level indicating a level of assurance of authentication required for the user context.

In an embodiment, the set of authentication schemes for the current user context is a subset of a set of all authentication schemes available for the computer system, the subset including authentication schemes being predetermined to provide a level of assurance of authentication in accordance with the authentication level for the user context.

In an embodiment, each rule in the set of user-specific rules is defined for each context based on a learning process whereby preferred authentication schemes are identified based on a frequency of use of the authentication schemes in prior requests by the requesting user to access the restricted resource.

In an embodiment, the user context defines characteristics of the requesting user taken from the set of: geographic location characteristics; computer network location characteristics; user device characteristics; user device type; user device facilities; user device capabilities; user device software version; and a class of the user in an access control system.

In an embodiment, the set of authentication schemes includes at least two of: password based authentication; passphrase based authentication; hardware token based authentication; software token base authentication; at least one biometric based authentication; multi-factor authentication including a plurality of authentication methods; certificate based authentication; authentication by a cloud security provider; authentication by a cloud service credential; authentication by a social network credential; and a smart-card based authentication.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 7 is a flowchart of a method of the authentication component of FIG. 3B in accordance with embodiments of the present disclosure.

DETAILED DESCRIPTION OF EMBODIMENTS

Figure 1:
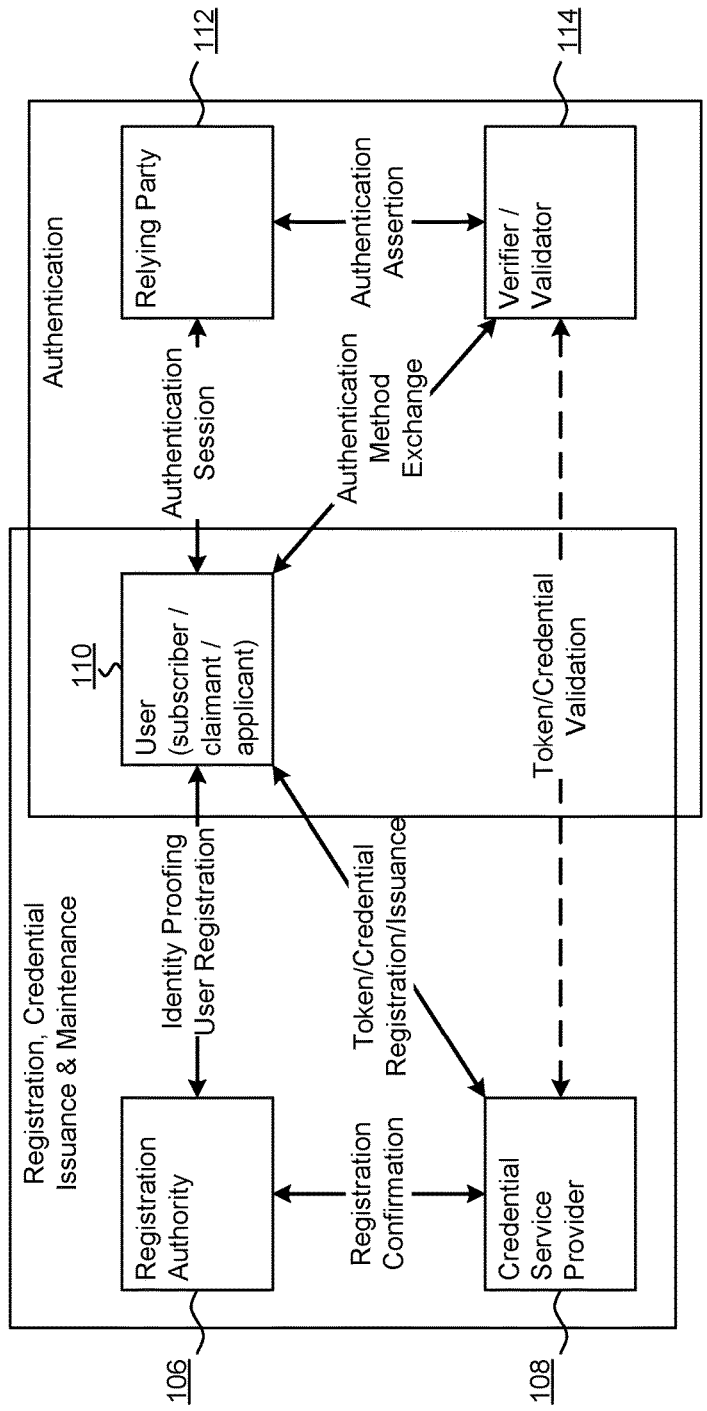
FIG. 1 depicts the National Institute of Standards and Technology E-Authentication Architectural Model (SP 800-63-1) in the prior art.
Figure 2:
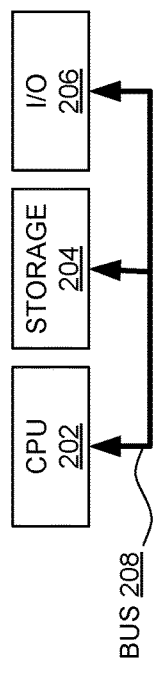
FIG. 2 is a block diagram of a computer system suitable for the operation of embodiments of the present disclosure.

FIG. 2 is a block diagram of a computer system suitable for the operation of embodiments of the present disclosure. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3A:
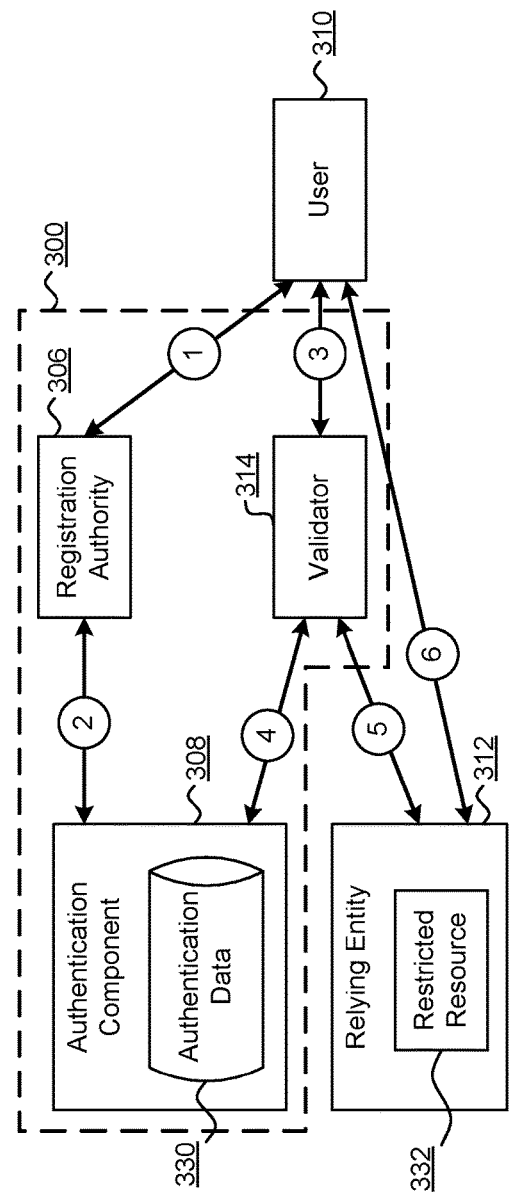
FIG. 3A is a component diagram of an authentication arrangement for authenticating a user in accordance with embodiments of the present disclosure.

FIG. 3A is a component diagram of an authentication arrangement 300 for authenticating a user 310 in accordance with embodiments of the present disclosure. The authentication arrangement 300 is an arrangement of components each implemented as any of software components, hardware components or firmware components for providing authentication of a user 310 requesting access to a restricted resource 332 of a relying entity 312.

The user 310 can be a person or conceivably an entity such as an automated agent or system seeking to confirm its identity to the authentication arrangement 300. The user 310 has associated a current user context. The user context is a characterization of one or more characteristics of the user 310. Such characteristics are many and varied and include, inter alia: a location of the user 310, such as a geographic location, a relative location, a network location etc.; a hardware device with or via which the user 310 requests access to the restricted resource 332, such as a type of device, network or facility (e.g. tablet, laptop, desktop, terminal, smartphone and the like) or a specific device, network or facility (model and manufacturer, serial number etc.); characteristics of a device or software component with or via which the user 310 requests access to the restricted resource 332, such as an operating system type or version, a security configuration, a state of operation, a software configuration state including the installation or configuration of certain security software and the like; a category, class or type of the user 310, such as a user class assigned by a system administrator, or a job role or function of the user. Other suitable contextual characteristics will be apparent to those skilled in the art and embodiments of the present disclosure are not limited to specific characteristics. Notably, the context can further include characteristics of the restricted resource 332 to which the user 310 requests access (and, accordingly, constitute characteristics associated with the user 310), such as a type of resource or a level of security of the resource. Further, the context can include a combination of characteristics for both the restricted resource 332 and the user 310.

The relying entity 312 is a software or hardware component, such as a computer system, or a software service, application, executable component or other software entity operating with or in a computer system. For example, the relying entity 322 is an application executing in a virtual machine of a virtualized computing environment. In some embodiments, the relying entity 312 is a cloud computing software service or application executing in a cloud computing environment.

The restricted resource 332 is a software, hardware or firmware resource to which the user requests access. In one embodiment, the resource 332 is a flag or indicator for indicating to the relying entity 312 that the user 310 is authenticated for the relying entity 312 and access, by the user 310, to the restricted resource 332 serves to indicate authentication of the user 310 in order that the user 310 is able to access resources, facilities, operations or functions of the relying entity 312 or a software, hardware or firmware component associated with the relying entity 312. In some embodiments, the restricted resource 332 is a software component, software function, software object, software routine, software class or other executable or instantiable software construct or component. In some embodiments, the restricted resource 332 is a data structure, data item, data construct, instantiated class, software object, data store, database or other data storage mechanism. While the restricted resource 332 is indicated as being comprised with the relying entity 312 it will be appreciated by those skilled in the art that the restricted resource 332 could alternatively be provided otherwise than as part of a relying entity or an entity with which a user 310 directly seeks authentication. For example, the relying entity 312 may be a delegated authentication agent, a security service, an interface, a software class or object or other suitable component responsible for confirming or ascertaining the identity of the user 310. It will be appreciated by those skilled in the art that confirming or ascertaining the identity of the user 310, otherwise referred to as authenticating the user 310, is not a definitive process since authentication cannot necessarily be achieved definitively. That is to say that different levels of assurance can be associated with authentication schemes employed by the authentication arrangement 300 to authenticate the user 310, and while the words "authenticate", "authenticated" and "authentication" are used herein, these should not be taken to refer to absolute and definitive authentication beyond all doubt—rather they are to be taken to mean a level, degree or attempt to authenticate the user 310 with some level or degree of assurance that may be objectively or subjectively evaluated for an authentication scheme.

The authentication arrangement includes an authentication component or apparatus 308 as a software, hardware or firmware component for authenticating the user 310 requesting access to the restricted resource 312. The authentication component 308 includes a data store storing authentication data 330. Authentication data 330 includes data and/or software components for undertaking authentication of the user 310. It will be appreciated that authentication data 330 can include software components such as executable software routines, functions, procedures, objects and classes along with application programming interfaces (APIs) and data structures, databases and the like to provide authentication services. In one embodiment, the authentication data 330 includes a definition of a set of authentication schemes for each of a set of user contexts for the user 310. Thus, for example, a user context defined for user characteristics including a particular geographic location and a particular user device has associated a set of authentication schemes stored as authentication data 330 of the authentication component 308. Further, in one embodiment, the authentication data 330 includes a definition of a set of user contexts for the user 310; a definition of authentication schemes to which the user 310 is registered; a store of registration information for the user 310 for one or more authentication schemes; a definition of a plurality of levels of authentication, each level of authentication having a level of assurance associated therewith, for classifying authentication schemes; and the like as will be described in more detail later.

An authentication scheme is an individual or aggregate of mechanisms or processes for achieving authentication of the user 310. Examples of authentication schemes including individual authentication mechanisms include, inter alia: a password based authentication process; a fingerprint based authentication process; a certificate based authentication process; etc. Aggregate mechanisms or processes for achieving authentication of the user 310 include multi-factor authentication mechanisms employing multiple individual authentication mechanisms, for example, a two-factor authentication scheme can include both a password based authentication process and a hardware token based authentication process. Authentication schemes including aggregate authentication mechanisms can include potentially any number of authentication mechanisms, and the examples provided here are certainly not exhaustive of the nature or arrangement of authentication schemes. Thus it will be appreciated that an authentication scheme can include a definition or identification of one or more authentication mechanisms or processes, each of which can have associated software, hardware or firmware components such as executable or instantiable software functions, procedures, objects or classes and associated data structures or database information for configuration and for confirming authentication.

In an exemplary embodiment, an authentication scheme including a password based authentication process and a hardware token authentication process can have associated a first software component for providing a password challenge to the user 310; receiving a password response from the user 310; and validating the response with reference to a data structure or data store for validating a correct response. The first software component thus has associated a data store, database or data structure including information for validating a correct response. The authentication scheme will further have associated a second software component for providing a hardware token challenge to the user 310; receiving a hardware token response from the user 310; and validating the response with reference to a further software routine for determining a correct response to the hardware token challenge. Such software components, or references to such software components, along with associated software routines and data are stored or referenced by, or in associated with, the authentication data 330.

The authentication arrangement 300 further includes a registration authority 306 as a software, hardware or firmware component for registering the user 310 with authentication mechanisms of authentication schemes of the authorization component 308. Registration of the user 310 for an authentication mechanism includes providing credentials to the authentication component 308 for validating the identity of the user 310. For example, registration via the registration authority 306 for a password based authentication mechanism includes registering, for storage or reference by the authentication component 308, information about a password for the user 310. In one example where the user 310 selects his or her own password the password is received by the registration authority 306 and used to store information about the password by the authentication component 308 such that, when the user 310 seeks to authenticate using an authentication scheme including a password based authentication mechanism, the user's password 310 can be validated by the authentication component 308. Notably, the password itself may not be stored by the authentication component 308 since some data derived from the password, such as a hash, checksum or other derivative of the password can be used as is well known in the art.

In other examples, the registration authority provides for the registration, by the user 310, of multiple credentials, data or attributes for authentication mechanisms of authentication schemes provided by the authentication component 308 such as, inter alia: biometric fingerprint information; biometric iris information, facial recognition images or definitions; voice recognition information; passphrases; registration of one or more hardware, software or firmware tokens; registration of a user-associated device such as a cellular or mobile telephone, tablet, computer system or other device; registration of personal information such as secret data including answers to questions, private information, telephone numbers, addresses, dates, relationship details and the like; certificate or certificate authority information; smart card registration; registration or reference to third party authentication services such as cloud computing authentication services, social network authentication information, cloud email services and the like; geographic information; and information required by any other authentication mechanism suitable for use with authentication schemes in embodiments of the present invention. In some embodiments the registration process is achieved by the user 310 in a most assured manner, such as in person with reference to highly assured authentication mechanisms such as state issued personal identity documents or credentials including, inter alia: an identity card; a passport; a driver's license; and the like.

The authentication arrangement 300 further includes a validator 314 as a software, hardware or firmware component for validating an identity of the user 310 using the authentication component 308. The validator 314 can provide an interface between the user 310 and the authentication component 308. In some embodiments the validator 314 and authentication component 308 are combined as a single entity. The validator 314 receives a request from the user 310 to access the restricted resource 332 for which authentication is required. The user request has associated, includes or implies a current user context defining one or more characteristics of the user as described above. The user context is current in the sense that it applies at the time the user 310 requests access to the restricted resource 332, and thus the context of the user can change with time as characteristics of, or associated with, the user 310 change. For example, as the user 310 changes location, device, network, software etc. then the user context can also change. The validator 314 operates with the authentication component 308 to identify a set of authentication schemes suitable for authenticating the user 310 in the current user context. The validator 314 receives a user selected authentication scheme for the current user context. The validator 314 then seeks to implement the selected user authentication scheme by executing, instantiating or otherwise providing the authentication scheme for the user 310 based on the authentication data 330. This can involve the validator 314 communicating one or more challenges to the user 310 and receiving one or more responses from the user 310 in order to validate the identity of the user 310 to authenticate the user 310. As will be described in detail below, embodiments of the present disclosure provide for a comparison of the authentication scheme selected with a set of user-specific rules stored in or with the authentication data 330. The rules indicate one or more authentication schemes for the user 310 in the current user context as preferred authentication schemes. Thus, as is described in detail below, the authentication component 308 permits access to the restricted resource 332 based on a comparison with the use-specific rules so as to prevent access to the restricted resource 332 when the rules indicate one or more authentication schemes other than the user selected authentication scheme are preferred for the current user context.

Thus, in use, the process of FIG. 3A can be summarized as (with reference to the numbered tasks in FIG. 3A):

1. The user 310 registers for a plurality of authentication mechanisms for a plurality of authentication schemes of the authentication component 308;
2. The registration authority 306 operates with the authentication component 308 to record the user 310 registration information for authentication mechanisms in the authentication data 330 of the authentication component 308;
3. The user 310 subsequently requests, via the validator 314, access to the restricted resource 332, the user request having associated a current user context;
4. The validator 314 operates with the authentication component 308 to identify a set of authentication schemes for the current user context. The validator 314 further receives a user selected authentication scheme from the user 310, and the authentication component 308 compares the user selected authentication scheme with a set of user-specific rules to determine if access to the restricted resource 332 is to be prevented;
5. Where the user is successfully authenticated by the authentication component 308, the validator (authentication component) permits access to the restricted resource 332. For example, this can involve communicating a notification to the relying entity 312 that the authentication is successful; and
6. The user 310 is permitted access to the restricted resource 332.

Figure 3B:
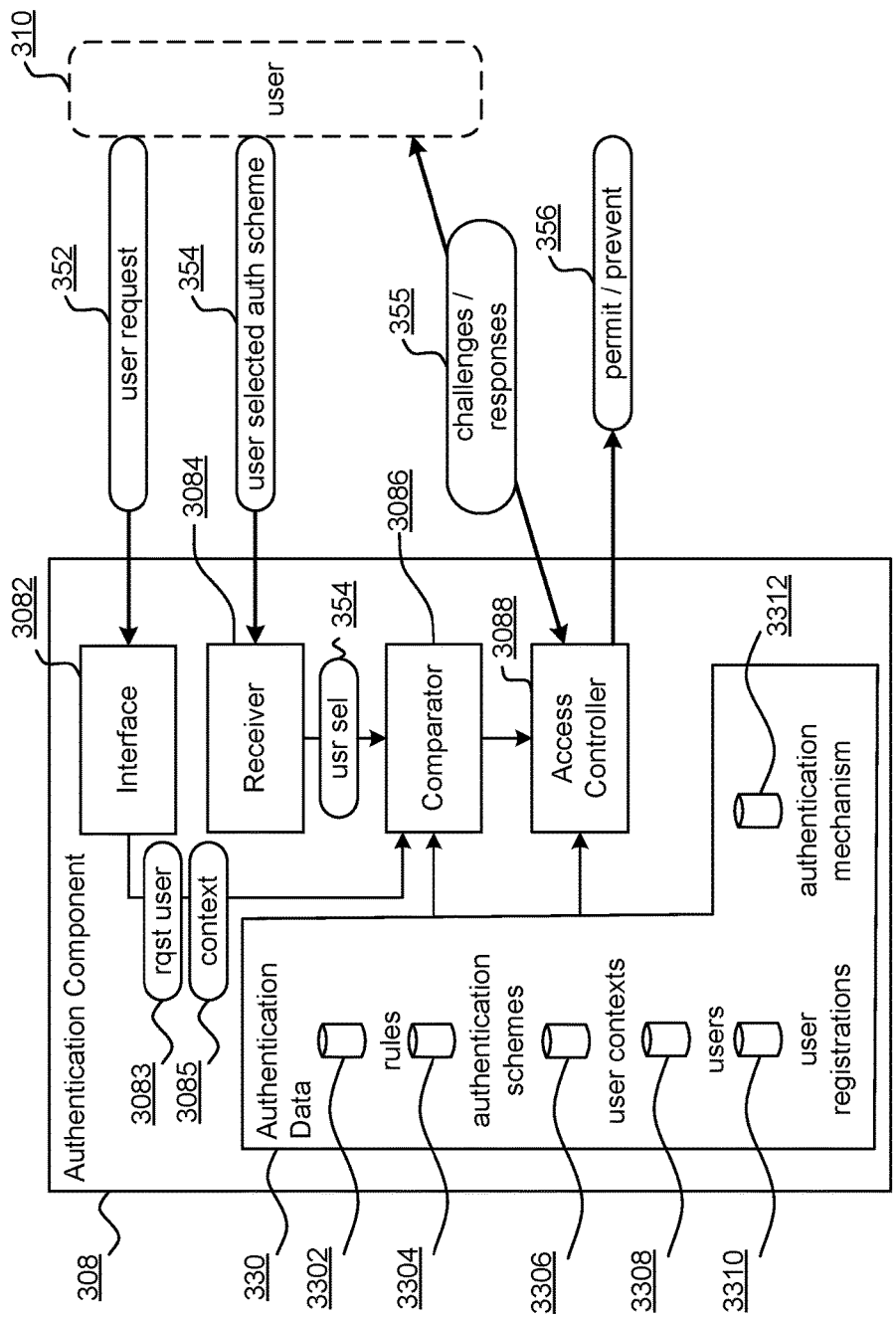
FIG. 3B is a component diagram of an authentication component of FIG. 3A in accordance with embodiments of the present disclosure.

FIG. 3B is a component diagram of an authentication component 308 of FIG. 3A in accordance with embodiments of the present disclosure. The authentication component 308 includes authentication data 330 having a plurality of datasets 3302 to 3312. Each of the datasets 3302 to 3312 can be a database, a data structure, a set of data structures, files, streams and the like. In some embodiments, one or more of the datasets 3302 to 3312 are provided by software or hardware components such as executing software services or applications residing with, or in communication with, the authentication component 308 and being accessible to the authentication component 308 via an interface.

The authentication data includes user data 3308 having information about users that have registered, or can register, with the authentication component 308 for authentication services. Each user has associated one or more sets of user registration data 3310, each set of user registration data being suitable for authenticating a user using a particular authentication mechanism or process referenced or stored in an authentication mechanism store 3312. The authentication mechanism store 3312 includes references to, and/or definitions of schemes or processes for, individual authentication mechanisms or processes. For example, an entry in the authentication mechanisms 3312 store for a password based authentication mechanism may include references to software components, objects, classes, functions or procedures for generating a password challenge and receiving a password response, and for validating such response with a user registration 3310 (or information referenced by a user registration 3310) in order to authenticate a requesting user.

The authentication data 330 also includes a definition of a plurality of user contexts 3306 representing a context of a user requesting access to a restricted resource 332. Each user context 3306 defines, represents or relates to one or more characteristics of a requesting user. Each user context 3306 has associated a particular authentication level as a level or degree of assurance required to authenticate a user requesting access to a restricted resource 332 when the user is in the user context 3306. Thus, certain user context 3306 will be predetermined to require higher levels of assurance that other user contexts 3306, and an authentication level for user contexts 3306 is selected accordingly.

The authentication data 330 further includes a definition of a plurality of authentication schemes 3304, each authentication scheme comprising one or more authentication mechanisms 3312 to achieve authentication with a particular level of assurance, known as an authentication level. Authentication schemes 3304 are defined or selected so as to provide a level or degree of assurance of authentication predetermined to be appropriate for an authentication level.

While user registrations 3310 has been described on a per-authentication mechanism 3312 basis, it will be apparent to those skilled in the art that user registrations 3310 can alternatively apply on a per-authentication scheme 3304 basis. Thus, registration by a user with an authentication scheme will involve providing authentication information required for all authentication mechanisms 3312 constituting the authentication scheme. Registration with authentication schemes as opposed to individual authentication mechanisms will be used throughout the remainder of the present description for simplicity.

Figure 4:
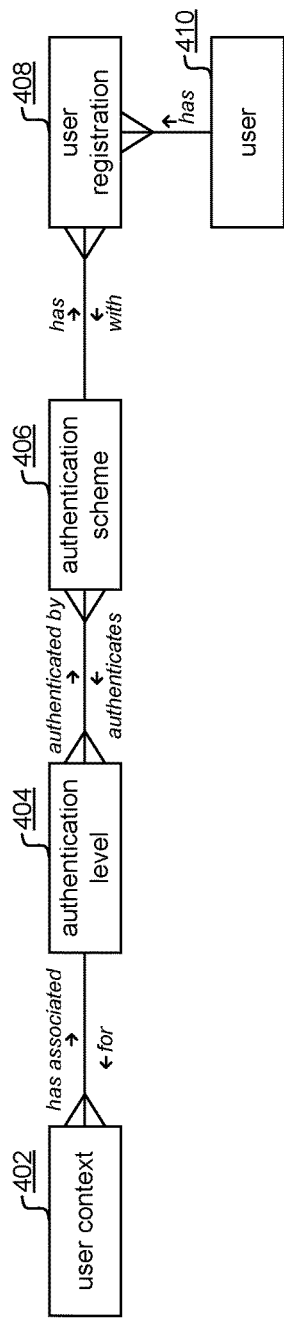
FIG. 4 illustrates an exemplary schema of the authentication data of FIGS. 3A and 3B in accordance with embodiments of the present disclosure.

FIG. 4 illustrates an exemplary schema of the authentication data 330 of FIGS. 3A and 3B in accordance with embodiments of the present disclosure. Each element of FIG. 4 indicates a schematic data element as will be apparent to those skilled in the art, the data elements being stored in the authentication data 330 of FIGS. 3A and 3B. A user context 402 has associated an authentication level 404, the authentication level 404 applying for one or more user contexts 402. Each authentication level 404 is authenticated by one or more authentication schemes 406, each authentication scheme 406 authenticating one or more authentication levels 404. A user 410 has one or more user registrations 408, each user registration being a registration for the user with an authentication scheme 406. Thus, each authentication scheme 406 has potentially numerous user registrations 408. Accordingly, in this way a user 410 registers with one or more authentication schemes 406 via user registrations 408. Each authentication scheme is suitable for authenticating one or more authentication levels 404, each authentication level 404 being associated with a user context 402. Thus, in use, a user request to access a restricted resource 332 is authenticated by an authentication scheme 406 associated with an authentication level 404 for a user context 402 associated with the user 410. As described above, a plurality of authentication schemes 406 associated with an authentication level 404 for a user context 402 associated with the user 410 are selected between by the user 410, and such selection itself is used as a soft-biometric to inform the authentication process as will be described in more detail below.

Returning to FIG. 3B, the authentication component 308 further includes an interface 3082 for receiving a user request 352 from a requesting user 310 to access a restricted resource 332. The interface 3082 can be a hardware, software or firmware interface such as a programming interface (API), a network interface, a software service or the like. The user request 352 has associated a user context 3085. For example, the user context 3085 can be included with the user request 352 as one or more data items of the user request 352. Alternatively, the user context 3085 can be discernible from, implied by, determined based on or otherwise inferred from the user request 352 of the user 310. For example, characteristics of the user 310, the request 352, the manner of receipt of the request 352, a network route or trace of the request 352, or third party information regarding the request 352 such as information from intermediaries between the user 310 and the authentication component 308 can be used to determine the user context 3085. Additionally or alternatively, the user context can be wholly or partly included in the user request 352. In one embodiment, the user context 3085 is determined by the interface 3082, or a component associated with the interface 3082 or the authentication component 308, by requesting information about or relating to the user 310 or systems, hardware, software or firmware associated with, used by, or involved in the activities of the user 310. Example sources of user context information can include: network routes; network address; network location; network intermediary information; user-side software information such as software type, version and/or configuration information; user device information such as device type (cellphone, laptop, tablet, internet café device etc.), configuration and/or version or model information; frequency of request by the user 310; recent request information such as recent authentication request outcomes (permitted or prevented); user 310 personal details such as user 310 age, circumstances (e.g. convictions, historical attack information relating to the user etc.); user 310 physical or mental capabilities; user 310 geographic location; user 310 movement across a geography; a rate of user 310 movement; a particular state or territory of the user; known legislation applying in a particular state or territory of the user 310; the use 310 of intermediaries between the user 310 and the authentication component 308, such as anonymity services, proxies, virtual private network services and the like; a level of security of a system employed by the user or as part of network communication with the user; a level of encryption of information communicated to and/or from the user; and the like.

On receipt by the interface 3082, the user context 3085 and an identification 3083 of the requesting user 310 are provided to a comparator 3086. The comparator 3086 is a software, hardware or firmware component adapted to undertake a comparison of a user selected authentication scheme with a set of user-specific rules 3302 stored in the authentication data 330. Each rule in the store of rules 3302 indicates one or more authentication schemes for a particular user in a user context as a preferred authentication scheme. Thus, the comparator further receives, via a receiver 3084, a user selected authentication scheme 354 from the user 310. The receiver 3084 is a software, hardware or firmware component adapted to receive a user selected authentication scheme 354 from the user. For example, the receiver 3084 includes an application, software or network interface via which the user selected authentication scheme 354 is received. In one embodiment, the user selected authentication scheme 354 is selected based on a list of authentication schemes offered by the receiver 3084 or the interface 3082 or another component or function of the authentication component 308 based on the user context 3085. For example, in one embodiment, the user context 3085 is determined or received and a subset of authentication schemes 3304 associated with an authentication level 404 associated with the user context 3085 is provided to the user 310 for selection therebetween of a single authentication scheme 3304 as the user selected authentication scheme 354. In an alternative embodiment, the user selected authentication scheme 354 is provided in association with the user request 352, where the user 310, user device or software of the user device has an indication of acceptable authentication schemes 354 for the user context 3085, such as based on historical authentication processes undertaken by the user 310.

The user selected authentication scheme 354 is provided to the comparator 3086 for comparison with the rules 3302. In a simple embodiment, the rules are organized to indicate one or more preferred authentication schemes for a user in a user context. Thus, in one embodiment, the rules can be organized in a data structure, table, database or the like having a structure such as:

| User | User Context | Preferred Authentication Scheme(s) |
|---|---|---|
| ... | ... | ... |

An access controller component 3088 is a software, hardware or firmware component for undertaking authentication of the user 310. In one embodiment, the access controller component 3088 is initially operable to verify that the user selected authentication scheme 354 is suitable for authenticating the user in view of the current user context 3085 of the user. On positive verification, the access controller component 3088 subsequently instantiates, implements, operates or executes the user selected authentication scheme 354 through each authentication mechanism in the user selected authentication scheme 354 based on the authentication data 330. In particular, the authentication schemes 3304 define the authentication mechanisms 3312 for the user selected authentication scheme 354. Thus, the access controller 3088 will undertake one or more processes of transmitting challenges and/or receiving responses 355 to/from the user 310 (or other systems, such as hardware or software associated with the user or third party services providers that constitute part of one or more authentication mechanisms 3312). On conclusion of the challenge/response 355 process for all authentication mechanisms 3312 of the user selected authentication scheme 354, the access controller is able to determine, based on user registration information 3310, whether the user is satisfactorily authenticated.

The access controller 3088 subsequently indicates whether access to the restricted resource 332 should be permitted or prevented 356. This indication is based on the comparison of the comparator 3086 such that, when the rules 3302 indicate one or more authentication schemes other than the user selected authentication scheme 354 are preferred for the user 310 in the current user context 3085, the access controller indicates that access to the restricted resource 332 should be prevented. The access controller 3088 generates an indication that access should be permitted when: the comparison of the comparator 3086 indicates that the user selected authentication scheme 354 corresponds to a preferred authentication scheme for the user 310 in the current user context 3085; and access controller 3088 determines, via the challenge/response 355 process, that the user 310 is successfully authenticated by the user selected authentication scheme 354. In one embodiment, where the access controller 3088 generates an indication that access to the restricted resource should be prevented, one or more changes are made to the authentication data to increase an authentication level for future user requests for access to the restricted resource 332. For example, an authentication level of the for the current user context 3085 (and, preferably, for all user contexts) is increased either incrementally or assigned to a higher authentication level for all user contexts as a security measure to require a higher level of assurance for a future authentication request. Alternatively, protective measures or systems can be engaged or invoked to additionally secure the restricted resource 332 and require the user to re-register for authentication schemes 3304 or mechanisms 3312 to access the restricted resource 332.

Thus, in this way, authentication for a requesting user 310 is based partly on user-specific rules 3304 indicating preferred authentication schemes. Preferred authentication schemes can be learned through a learning process, such as a machine learning, historical learning, statistical or other process as will be described below. Such preferred authentication schemes reflect the behavior and preferences of the user 310 and represent typical, most likely, most probable, most effective or least unlikely authentication schemes. Recognizing deviations from typical, preferred, consistent or most effective schemes based on the user's 310 past authentications serves as an additional behavioral or soft-biometric dimension of authentication, as an additional factor to any n-factor authentication scheme. In contrast to existing approaches, the user-specific rules 3302 serve to complement authentication mechanisms 3312 for an authentication scheme and, in particular, serve to identify authentication attempts which are atypical based on historical, behavioral, typical or statistical determinations. In some embodiments, the user-specific rules 3302 serve to identify inconsistent authentication attempts and flag such attempts for handling, such as precluding authentication. Identification of authentication attempts with inconsistent, atypical and/or less probable features results in preventing access to the restricted resource 332. In some embodiments, the prevention of access to the restricted resource 332 can be accompanied by a transition to an authentication scheme providing an increased level of assurance. Thus, the requesting user 310 can access the restricted resource 332 on satisfaction of authentication requirements corresponding to an increased level of assurance. Thus, embodiments of the present disclosure provide considerably enhanced authentication in which the soft-biometric of a user's 310 interaction with, use of and/or consistency with an authentication scheme serves, in itself, to contribute to the process of authentication.

In one embodiment, the user specific rules 3302 for the user 310 in a user context are defined based on evaluated probabilities of authentication schemes 3304, where the evaluated probability is based on a determined or measured frequency of use of each authentication scheme by the user 310 for a context, and a rate of successful authentication of each authentication scheme. The frequencies and rates are measured over a period of authentication by the user 310 or based on historical data for authentication of the user 310. In one embodiment, the probability associated with an authentication scheme for the user 310 in a user context is evaluated as a product of the frequency of use of the authentication scheme by the user 310 in the context and the rate of successful authentication of the authentication scheme by the user. In one embodiment, one or more authentication schemes for the user 310 in a context are ranked higher. Probabilities being highest ranked, or probabilities exceeding a predetermined threshold probability, are used to formulate the user-specific rules 3302.

Further, in one embodiment, the probability associated with an authentication scheme for the user 310 in a user context is compared with a probability for the authentication scheme for all users in the user context (i.e. including users other than user 310). A probability for an authentication scheme for all users in the user context is evaluated based on a determined or measured frequency of use of the authentication scheme by all users in the context using the authentication component 308, and a rate of successful authentication of each authentication scheme when used by all users in the context. In one embodiment, the probability associated with an authentication scheme for all users in a user context is evaluated as a product of the frequency of use of the authentication scheme by all users in the context and the rate of successful authentication of the authentication scheme by all users in the context.

In one embodiment, the preferred authentication schemes indicated by the user-specific rules 3302 for the user 310 in a particular context are identified as authentication schemes having a probability for the requesting user 310 that differs from a probability of the authentication scheme for all users by at least a predetermined threshold. Thus authentication schemes being determined to have associated a greater probability for the user 310 than for all users can be identified as preferred authentication schemes for the user 310. The predetermined threshold for such comparison can be based on an analysis of historical variations or deviations of probability between users to identify a statistically significant variation or deviation indicative of a user preference.

In one embodiment, the preferred authentication schemes 3304 for the user 310 in a particular user context are learned using machine learning, statistical analysis or other suitable techniques. For example, surprisingly, even a recommendation algorithm such as that described by Bouneffouf et al in "Following the User's Interests in Mobile Context-Aware Recommender Systems: The hybrid-ε-greedy algorithm" (IEEE, 2012), can be adapted for use to determine preferred authentication schemes of the user 310. Such approaches are usually reserved for recommending content such as images, texts, sounds, videos etc. However, such systems can be adapted to learn preferences in an authentication system to identify atypicality in the selection of authentication schemes by users in a particular context.

Figure 5:
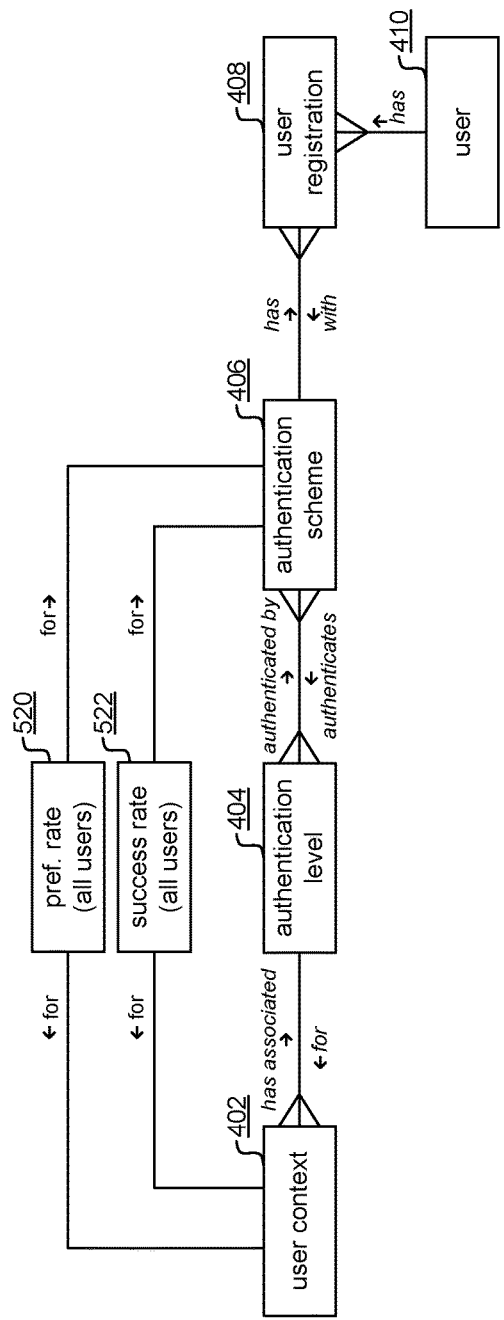
FIG. 5 illustrates an exemplary schema of the authentication data of FIGS. 3A and 3B in accordance with embodiments of the present disclosure.

Thus, in some embodiments, each rule in the set of user-specific rules 3302 is defined for a user context 402 based on a learning process whereby preferred authentication schemes are identified based on a frequency of use of the authentication schemes in prior requests by the requesting user 310 to access the restricted resource 332. FIG. 5 illustrates an exemplary schema of the authentication data 330 of FIGS. 3A and 3B in accordance with embodiments of the present disclosure. Many of the features of FIG. 5 are identical to those described above with respect to FIG. 4 and these will not be repeated here. FIG. 5 further includes a preference rate (or frequency) 520 of selection or use of an authentication scheme in a user context for all users. Further, FIG. 5 includes a success rate of an authentication scheme in a user context for all users. Thus, a probability for an authentication scheme 406 in a user context 402 for all users is evaluated as a product of the preference rate 520 and the success rate 522.

Figure 6:
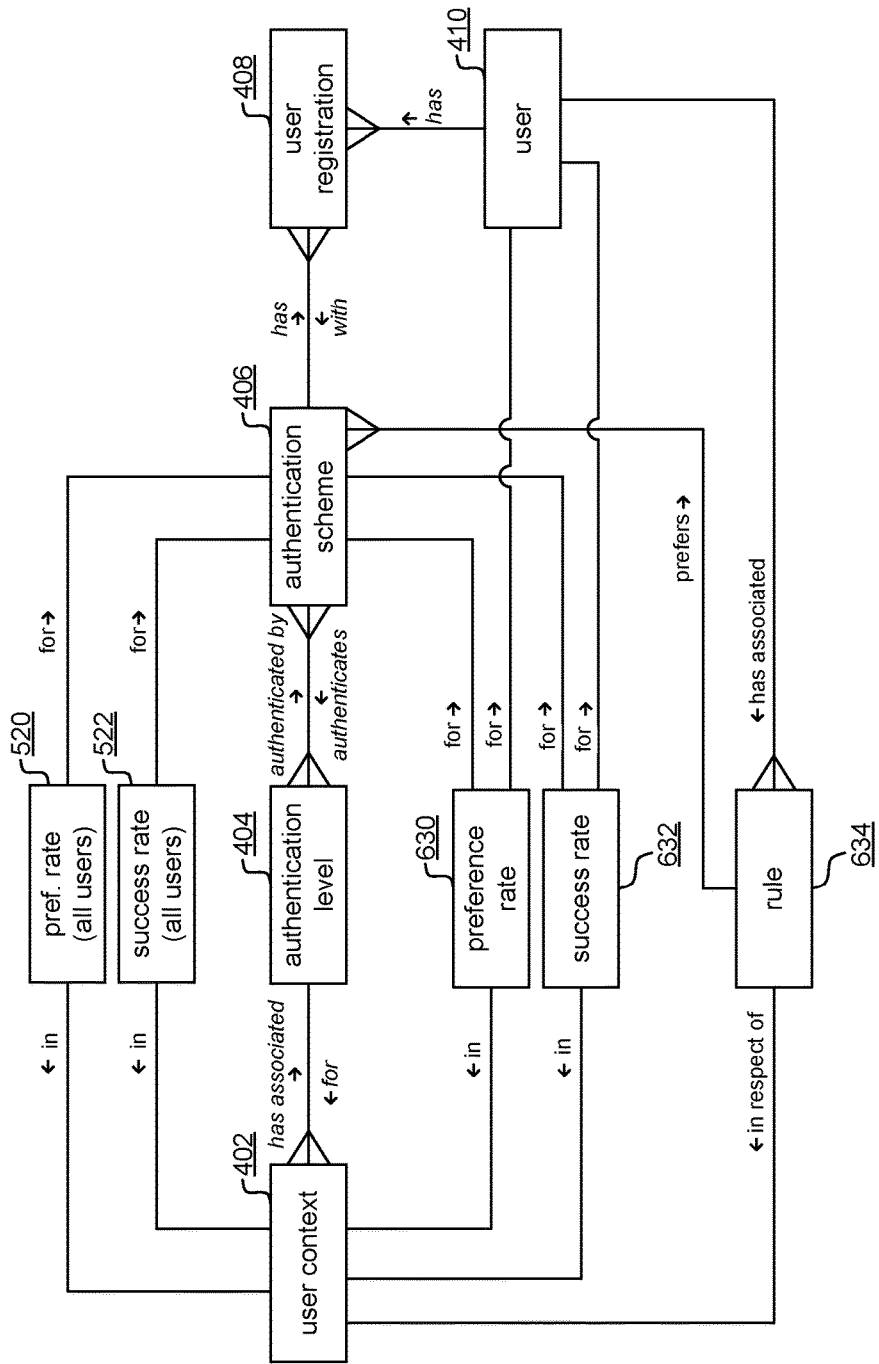
FIG. 6 illustrates an exemplary schema of the authentication data of FIGS. 3A and 3B in accordance with embodiments of the present disclosure.

FIG. 6 illustrates an exemplary schema of the authentication data 330 of FIGS. 3A and 3B in accordance with embodiments of the present disclosure. Many of the features of FIG. 6 are identical to those described above with respect to FIGS. 4 and 5 and these will not be repeated here. FIG. 6 further includes a preference rate (or frequency) 630 of selection or use of an authentication scheme in a user context for a specific user 410. Further, FIG. 6 includes a success rate of an authentication scheme in a user context for a specific user 410. Thus, a probability for an authentication scheme 406 in a user context 402 for a specific user 410 is evaluated as a product of the preference rate 630 and the success rate 632 for the user.

Where one or more preferred authentication schemes 406 are identified for the user 410, such as by identifying a probability for the user 410 exceeding a probability for all users by at least predetermined threshold, then a rule 634 is defined. The user 410 has associated one or more rules 634, each rule 634 being defined in respect of a particular user context 402. Each rule indicates one or more authentication schemes 406 preferred by the user 410 for use by the comparator 3086 to identify atypical, less preferred, unfavorable or otherwise inconsistent selection by the user 310 of authentication schemes.

FIG. 7 is a flowchart of a method of the authentication component 308 of FIG. 3B in accordance with embodiments of the present disclosure. At 702 the interface 3082 receives an indication of a user request with an associated current user context 3085, the request being to access the restricted resource 332. The interface may receive the indication by receiving the user request 352 itself or, alternatively, by receiving an indicator that such a request has been made, such as an indicator provided by a relying entity 312 where the relying entity initially receives the user request 352. At 704 the receiver 3084 receives a user selected authentication scheme 354. At 706 the comparator 3086 compares the user selected authentication scheme 354 with a set of user-specific rules 3304 to identify if the user selected authentication scheme satisfies the rules at 708. Satisfaction of the rules indicates that the user selected authentication scheme 354 is consistent with the rules 3304, such as consistency with assertions made by the rules. For example, a rule 634 can be a data structure for defining an assertion that a user 410 in a particular user context 402 uses one or more authentication schemes 406. Where the comparator 3086 determines that the user selected authentication scheme 354 for the user 310 in the current context 3085 does not satisfy, or is inconsistent with, a rule, then the method proceeds to 712 where the access controller 3088 indicates that access to the restricted resource is to be prevented. Alternatively, where the comparator 3086 determines that the user selected authentication scheme 354 for the user 310 in the current context 3085 does satisfy, or is consistent with, a rule, then the method proceeds to 710 where the access controller 3088 indicates that access to the restricted resource is to be permitted.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of user authentication for user access to a restricted resource in a computer system comprising:
   receiving, by one or more hardware processors, an indication of a user request to access the restricted resource, the request having associated a current user context defining one or more characteristics of the user;
   receiving, by the one or more hardware processors, a user selected authentication scheme from a set of authentication schemes for the current user context;
   comparing, by the one or more hardware processors, the user selected authentication scheme with a set of user-specific rules, each rule indicating one or more authentication schemes for a user context as preferred authentication schemes; and
   permitting, by the one or more hardware processors, access to the restricted resource based on the comparison so as to prevent access to the restricted resource when the rules indicate one or more authentication schemes other than the user selected authentication scheme are preferred for the current user context,
   wherein each rule in the set of user-specific rules is defined for the user context based on a learning process whereby preferred authentication schemes are identified by evaluating a probability that any user is authenticated by each authentication scheme, wherein the probability that any user is authenticated by each authentication scheme is a product of the frequency of use by any user and the rate of successful authentication for any user for the authentication scheme, and
   wherein one or more preferred authentication schemes for the requesting user in the user context are identified based on authentication schemes having a probability for the requesting user that differs from a probability for any user by at least a predetermined threshold.

2. The method of claim 1 wherein the user context has associated a predetermined authentication level indicating a level of assurance of authentication required for the user context.

3. The method of claim 2 wherein the set of authentication schemes for the current user context is a subset of a set of all authentication schemes available for the computer system, the subset including authentication schemes being predetermined to provide a level of assurance of authentication in accordance with the authentication level for the user context.

4. The method of claim 1 wherein each rule in the set of user-specific rules is defined for the user context in a set of user contexts based on the learning process whereby preferred authentication schemes are identified based on a frequency of use of the authentication schemes in prior requests by the requesting user to access the restricted resource.

5. The method of claim 4 wherein the learning process for the user context includes, for a plurality of prior requests to access the restricted resource by any user:
   determining a frequency of use of each authentication scheme; and
   determining a rate of successful authentication of each authentication scheme.

6. The method of claim 5 wherein the learning process for the user context further includes, for a plurality of prior requests to access the restricted resource by the requesting user:
   determining a frequency of use of each authentication scheme; and
   determining a rate of successful authentication of each authentication scheme.

7. The method of claim 6 wherein the learning process for the user context further includes, for the requesting user, evaluating a probability that the user is authenticated by each authentication scheme.

8. The method of claim 7 wherein the probability for each authentication scheme is a product of the frequency of use by the requesting user and the rate of successful authentication of the requesting user for the authentication scheme.

9. The method of claim 8 wherein one or more preferred authentication schemes for the requesting user in a user context are identified based on authentication schemes having a greatest probability.

10. The method of claim 1 wherein the user context defines characteristics of the requesting user taken from the set of: geographic location characteristics, computer network location characteristics, user device characteristics, user device type, user device facilities, user device capabilities, user device software version and a class of the user in an access control system.

11. The method of claim 1 wherein the set of authentication schemes includes at least two of: password based authentication, passphrase based authentication, hardware token based authentication, software token based authentication, at least one biometric based authentication, multi-factor authentication including a plurality of authentication methods, certificate based authentication, authentication by a cloud security provider, authentication by a cloud service credential, authentication by a social network credential and a smartcard based authentication.

12. An authentication apparatus to authenticate a user requesting access to a restricted resource in a computer system comprising:
   an interface implemented on a programmable processing device of the computer system and configured to receive an indication of a user request to access the restricted resource, the request having associated a current user context defining one or more characteristics of the user;
   a receiver configured to receive a user selected authentication scheme from a set of authentication schemes for the current user context;
   a comparator implemented on a programmable processing device of the computer system and configured to compare the user selected authentication scheme with a set of user-specific rules, each rule indicating one or more authentication schemes for a user context as preferred authentication schemes; and an access controller implemented on a programmable processing device of the computer system and configured to permit access to the restricted resource based on the comparison so as to prevent access to the restricted resource when the rules indicate one or more authentication schemes other than the user selected authentication scheme are preferred for the current user context, wherein each rule in the set of user-specific rules is defined for the user context based on a learning process whereby preferred authentication schemes are identified by evaluating a probability that any user is authenticated by each authentication scheme, wherein the probability that any user is authenticated by each authentication scheme is a product of the frequency of use by any user and the rate of successful authentication for any user for the authentication scheme, and wherein one or more preferred authentication schemes for the requesting user in the user context are identified based on authentication schemes having a probability for the requesting user that differs from a probability for any user by at least a predetermined threshold.

13. The apparatus of claim 12 wherein the user context has associated a predetermined authentication level indicating a level of assurance of authentication required for the user context.

14. The apparatus of claim 13 wherein the set of authentication schemes for the current user context is a subset of a set of all authentication schemes available for the computer system, the subset including authentication schemes being predetermined to provide a level of assurance of authentication in accordance with the authentication level for the user context.

15. The apparatus of claim 12 wherein each rule in the set of user-specific rules is defined for each context based on a learning process whereby preferred authentication schemes are identified based on a frequency of use of the authentication schemes in prior requests by the requesting user to access the restricted resource.

16. The apparatus of claim 12 wherein the user context defines characteristics of the requesting user taken from the set of: geographic location characteristics, computer network location characteristics, user device characteristics, user device type, user device facilities, user device capabilities, user device software version and a class of the user in an access control system.

17. The apparatus of claim 12 wherein the set of authentication schemes includes at least two of: password based authentication, passphrase based authentication, hardware token based authentication, software token based authentication, at least one biometric based authentication, multi-factor authentication including a plurality of authentication methods, certificate based authentication, authentication by a cloud security provider, authentication by a cloud service credential, authentication by a social network credential, and a smartcard based authentication.

18. A non-transitory computer readable medium for storing computer program code to, when loaded into a computer system and executed thereon, cause the computer system to authenticate a user for user access to a restricted resource in a computer system by:

receiving, by one or more hardware processors, an indication of a user request to access the restricted resource, the request having associated a current user context defining one or more characteristics of the user;

receiving, by the one or more hardware processors, a user selected authentication scheme from a set of authentication schemes for the current user context;

comparing, by the one or more hardware processors, the user selected authentication scheme with a set of user-specific rules, each rule indicating one or more authentication schemes for a user context as preferred authentication schemes; and permitting, by the one or more hardware processors, access to the restricted resource based on the comparison so as to prevent access to the restricted resource when the rules indicate one or more authentication schemes other than the user selected authentication scheme are preferred for the current user context, wherein each rule in the set of user-specific rules is defined for the user context based on a learning process whereby preferred authentication schemes are identified by evaluating a probability that any user is authenticated by each authentication scheme, wherein the probability that any user is authenticated by each authentication scheme is a product of the frequency of use by any user and the rate of successful authentication for any user for the authentication scheme, and wherein one or more preferred authentication schemes for the requesting user in the user context are identified based on authentication schemes having a probability for the requesting user that differs from a probability for any user by at least a predetermined threshold.

* * * * *